June 5, 1956  A. J. JANIK  2,748,716
REVERSIBLE ROTARY PUMP
Filed Jan. 30, 1952  2 Sheets-Sheet 1
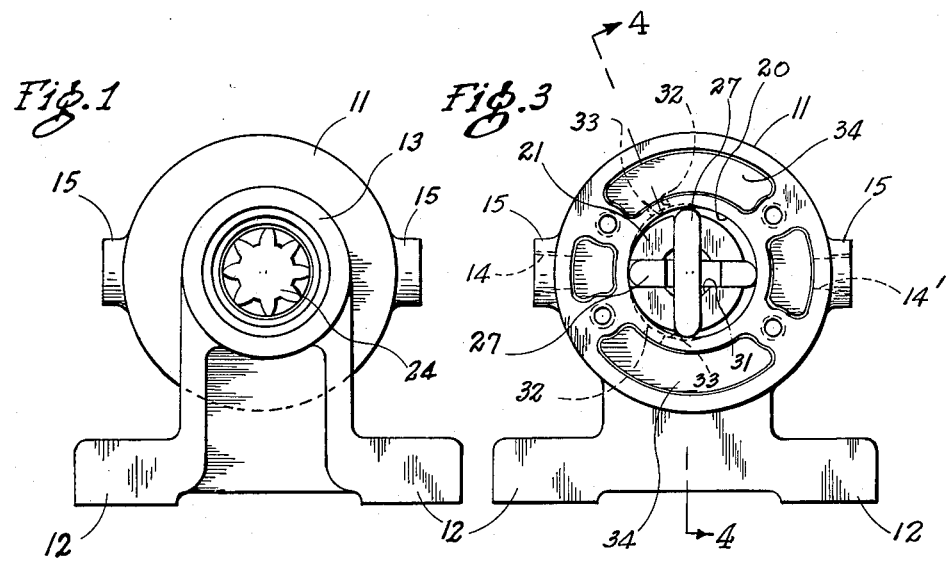
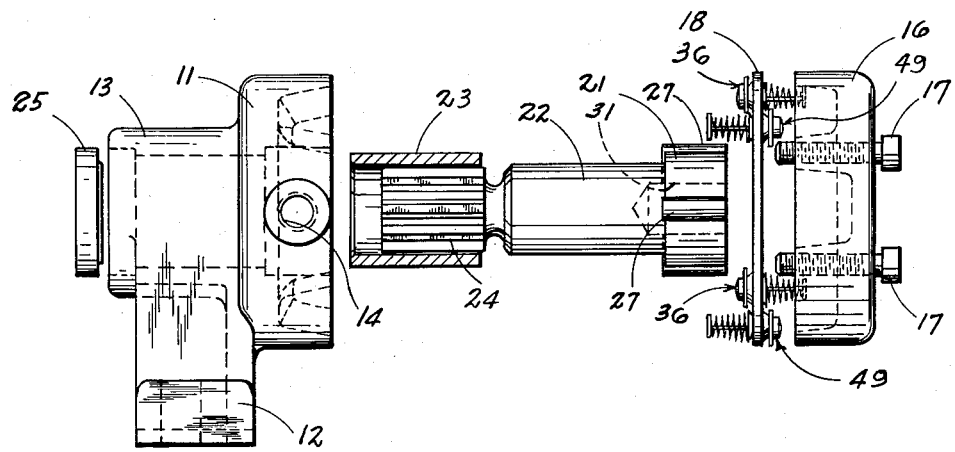
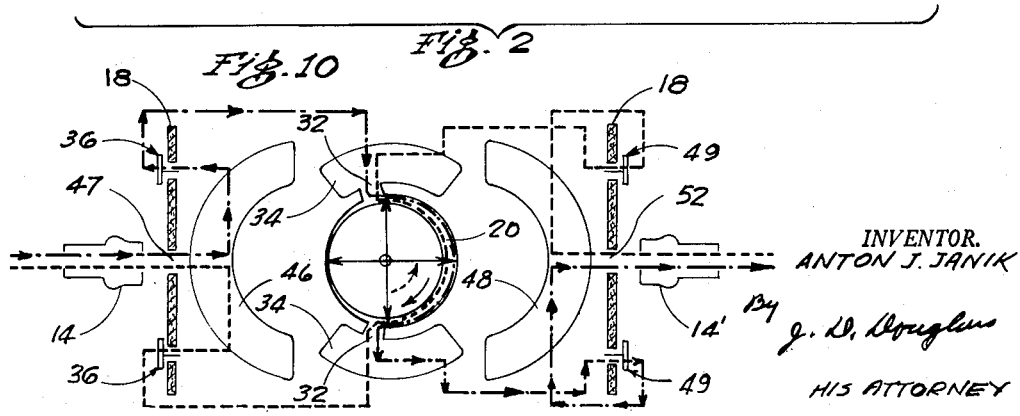
INVENTOR.
ANTON J. JANIK
BY J. D. Douglas
HIS ATTORNEY June 5, 1956  A. J. JANIK  2,748,716
REVERSIBLE ROTARY PUMP
Filed Jan. 30, 1952  2 Sheets-Sheet 2
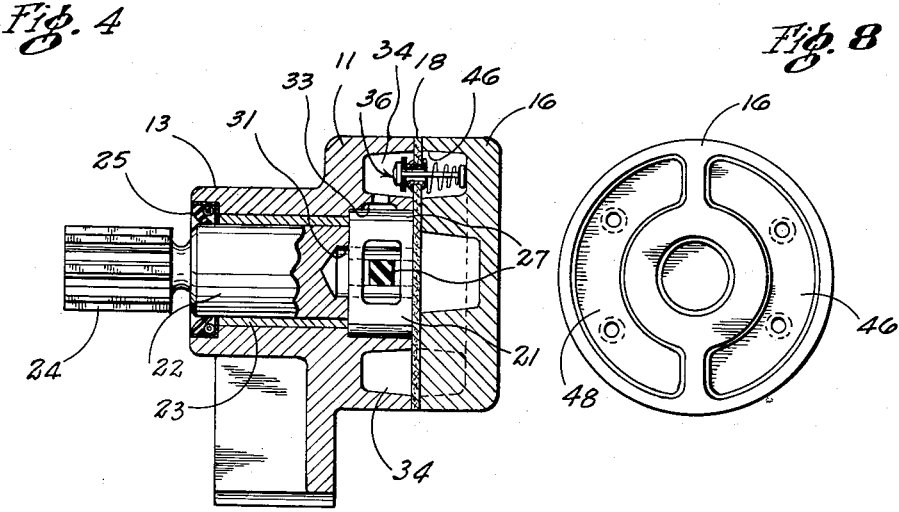
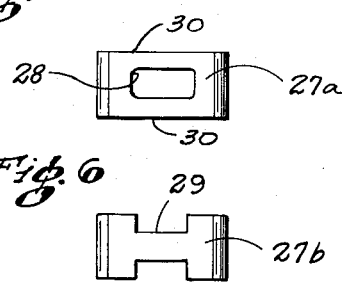
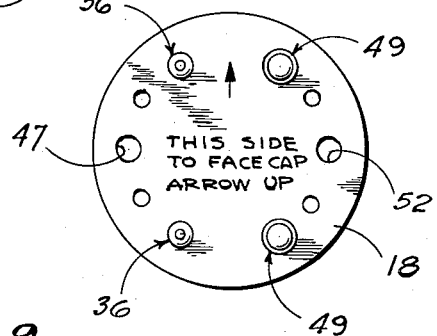
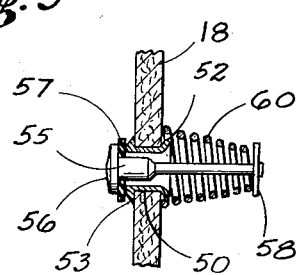
INVENTOR.
ANTON J. JANIK
BY
J. M. Douglas
HIS ATTORNEY

United States Patent Office 2,748,716
Patented June 5, 1956

2,748,716

REVERSIBLE ROTARY PUMP

Anton J. Janik, Elyria, Ohio, assignor to The Ridge Tool Company, Elyria, Ohio

Application January 30, 1952, Serial No. 269,022

8 Claims. (Cl. 103—138)

This invention relates to pumps and more particularly to a reversible rotary pump having improved vanes and valve system and is an improvement over that shown in my copending application, Ser. No. 161,660, filed May 12, 1950, now Patent No. 2,716,947, of which this is a continuation in part.

A great many different rotary pumps have been built in the past. Each was an attempt to overcome some particular problem and in so doing raised new problems. One of the simplest of the many proposed types of rotary pumps is the vane pump having an eccentric rotor in a chamber and carrying vanes which wipe the walls and pump the fluid by reason of the decreasing volume as the vanes approach the point where the eccentric mounted rotor most nearly touches the chamber wall.

Serious difficulties have been experienced with this type of pump by reason of the eccentricity. Spring loaded vanes adapted to slide into and out of the rotor have been used in order to maintain contact between the wall and vane throughout the entire cycle. However, under repeated flexings at moderate to high speeds, springs weaken or break. Continuous vanes have also been used extending through both sides of the rotor and slidably disposed therein. However, with this type of vane, the chamber wall must be formed with a curve either mathematically derived or mechanically laid out to accommodate a rigid blade. This formation increases the cost of the housing because of the added machining processes required to finish the inner surface of the chamber. Blades of this type have also been provided with springs to permit the use of circular chamber walls, but again these have not been successful because of the weakness of the spring.

Still another disadvantage of the rotary type of pump is the necessity of turning the shaft in only one direction. Thus, each pump required two models, a left hand and right hand rotating model to be adapted to all installations. Attempts to overcome this disadvantage included pumps which pumped in one direction when rotated one way and reversed the flow when turned the other way. This required careful handling of the connections to the pump in order to be sure the flow would be in the proper direction through the pipes. Another device used included a movable chamber arranged so that the chamber could be turned in the housing to change the relative positions of the inlet and outlet parts with respect to the rotor and the tubing or pipe connections for inlet and outlet.

By my invention, I provide an improved type rotary pump which may be rotated in either direction without manual change of any parts and still cause the fluid to flow through the same inlet and outlet ducts. The pump chamber has a circular wall, and no springs are used in the rotor at all. These advantages are accomplished by a system of poppet valves and manifolding which is not complex yet which fully serves the required purpose. The vanes in the rotor are formed from a resilient material, such as rubber or a synthetic rubber material which is resilient enough to be displaced the amount required to keep a tight seal between the vanes and a circular chamber.

Another advantage of the invention resides in the provision of an improved vane assembly which is simpler and more economical to construct, which construction greatly facilitates the assembly of the pump as well as the replacement of the vanes and rotor should the occasion for replacement occur.

A more complete understanding of the invention may be had from reference to the following figures and description which form a part of this specification.

In the drawings:

Fig. 1 is an end elevational view of my pump from the shaft end;

Fig. 2 is an exploded view of the pump from the side;

Fig. 3 is an elevational view of the housing with the cap and valve plate removed;

Fig. 4 is a medial sectional view from line 4—4 of Fig. 3;

Fig. 5 is a plan view of one rubber vane;

Fig. 6 is a plan view of another rubber vane;

Fig. 7 is a view of the valve plate and valve assembly;

Fig. 8 is a view looking into the cap;

Fig. 9 is an enlarged view showing one of the valves in detail; and

Fig. 10 is a plan diagram for the pump of my invention.

Briefly, my invention comprises a rotary vane pump having a circular cylindrical pump chamber in which an eccentrically mounted rotor carries vanes made of a resilient material which can be displaced sufficiently to engage the walls of the chamber at all times. A series of chambers and a system of valves is provided, arranged so that the flow of the fluid will always be from one tubing, pipe or inlet connection to its opposite outlet connection.

More specifically, and referring to the drawings, throughout which like numbers refer to like parts, the pump is enclosed in a generally circular body or housing 11. This body may be cast integrally with the mounting feet 12 and the bearing housing 13. As can be best seen in Fig. 1, the bearing housing and body are not concentric with each other but are slightly eccentric. The housing is formed with bosses 15 on diametrically opposite sides in which threaded holes 14 and 14' are formed for the connection of the necessary tubing or conduits to carry the fluid to be pumped. A cap 16 is fastened to the housing by screws 17 to enclose it and to provide manifolding chambers as will appear later. A plate 18 which serves as a valve plate and carries the valve is interposed between the housing 11 and the cap 16 and is held in place by the cap 16 and screws 17.

The inside of the housing 11 is formed into a plurality of chambers. The center chamber 20 is a circular cylindrical chamber in which is disposed a rotor 21, eccentrically disposed in relation to the chamber. The rotor 21 is carried on a shaft 22 which is journalled in a bronze bearing 23 in the bearing housing 13, this shaft extending into the chamber eccentric to the chamber; in this instance, the eccentricity being approximately 1/16 inch on the radius although obviously the amount of eccentricity would vary. At its other end, the shaft may be provided with a gear 24, or the like, to provide driving means for the rotor. An oil seal 25 may be provided about the shaft if desired.

The rotor 21 is of circular formation and has two diametrical slots in which are disposed vanes 27 formed of a resilient material similar to rubber. Since one of the anticipated uses of the pump is as an oil pump, the preferred material is one of the oil resistant synthetic rubbers, but it will be recognized that any soft resilient rubberlike material may be used. These vanes are made large enough to extend across the full diameter of the pump chamber 20. As they turn with the rotor 21, they are carried through a path where the distance between ends of a straight line is somewhat less than the diameter. However, since the vanes are made of the rubber-like material, they simply displace longitudinally and are in contact with the surface at all times. Moreover, the vanes are made wide enough to engage the surface of the pump chamber 20 along the sides of the vanes, thus assuring a truly positive displacement pump of excellent volumetric efficiency.

In order to use the two vanes 27, both extending completely across the chamber 20, it is necessary to interlock the vanes by some method. The preferred forms are shown in Figs. 5 and 6. One vane 27a is formed with a rectangular opening 28 in the center approximately the size and shape of a transverse cross section of the blade but certainly long enough to allow the vane to slide the requisite distance in its slot. The other vane 27b is formed with a necked down section. The neck 29 is approximately square so that it slides freely in the opening 28. To assemble the two vanes, the necked vane 27b is inserted into the opening 28 until it can be turned. It is then turned 90 degrees and arranged so that the vanes are properly disposed to be inserted into the rotor slots. It is apparent that by this construction, each vane is enabled to slide relative to the other in its slot; and at the same time, there will be a minimum tendency to buckle over upon being compressed. The vane 27a is not likely to bend because of the support remaining at the two edges 30. Nor is the vane 27b apt to bend, since its remaining support is at the center of the vane so that a uniform compression load on the end of the vane will simply displace the neck portion 29.

It will be apparent to those skilled in the art that the crossed vanes of the rotor could be formed in a single piece. However, in such a device, since the vanes are not relatively slidable, each portion of the vane must extend as far from the center of the rotor as the right hand part of the horizontal vane of Fig. 3. As that vane moved around, the material of the vane would be displaced inwardly into the central opening 31, which would have to be sufficiently large to accommodate the displaced material. This type of device thus requires more shortening of the vanes by such displacement, and, therefore, is considered less desirable, than the preferred arrangement previously described.

It will also be apparent to those skilled in the art that a pump of this type will operate with more or fewer vanes. A single two-ended vane, for instance, works very satisfactorily. Such a vane may either be a complete piece of solid material or may be cut out like either of the vanes 27a or 27b. These latter are somewhat more compressible at their center portions and, therefore, may be preferred even in a single vaned pump.

Inlet and outlet ports 32 are provided into the pump chamber 20. These ports are symmetrically spaced from a line between the centers of the rotor and the pump chamber (a horizontal line in Fig. 4). Thus it is apparent that either one could be an inlet or outlet port dependent on the direction of rotation of the rotor. As is customary in the art, relieved areas 33 are provided on each side of the ports to provide for more efficient fluid flow into and out of the pump.

Each of the ports 32 connects the pump chamber 20 with a valve chamber 34 formed in the pump housing 11. An inlet valve 36 is provided in each valve chamber 34. These chambers 34 are covered by the valve plate 18 which may be of sheet fiber and is provided with ports or orifices which comprise metallic grommets having a stem or neck portion 50 disposed in an opening in the plate. The end of the stem is spun or displaced outward at 52 after insertion to hold the same in place. The other end is provided with a head 53 which is highest at the opening and slants backward toward the base which lies flat at the plate 18. The valve includes a stem or shank 55 having a head 56 on one end. A soft flat flexible washer 57 of rubber, or synthetic rubber, such as "neoprene," is disposed between the underside of the heads and the seat 53 around the shank 55. The end of the stem extends well beyond the side of the plate 18 and has a washer 58 staked to its end. A conical compression spring 60 holds the valve seated on the seat, it being disposed around the stem with one end seated on the washer 58 and the larger end being in engagement with the side of the plate 18. Fluid pressure on the right side of the plate 18 will force the valve off of its seat. Thus the valve will admit fluid freely into the chamber 34 but seals tightly against any discharging fluid.

It will be noted (Fig. 7) that both inlet valves 36 are on one side of a vertical centerline. The orifices controlled by these valves communicate with the common inlet manifolding chamber 46 formed in the cap 16. The fluid enters this inlet chamber 46 through an orifice 47 leading from the inlet 14 in the housing. An outlet chamber 48 is also formed in the cap 16. Two outlet valves 49 substantially identical to the inlet valves 36 are provided in this chamber 48, being mounted in the opposite direction. These valves 49 control a pair of orifices, each of which leads to a different valve chamber 34. Thus, each valve chamber 34 is isolated from the fluid flow by an inlet valve 36 and an outlet valve 49. Each valve chamber 34 is therefore adapted to act as either an inlet or an outlet chamber to the pump chamber 20. The outlet chamber 48 connects to the outlet 14' by an open orifice 52 similar to the inlet orifice 47. It will be apparent that the inlet 14 and outlet 14' could lead directly into the inlet chamber 46 and outlet chamber 48 in the cap 16 instead of into the housing 11 as illustrated. The illustrated embodiment is preferred, however, since the permanent tubing or pipe connections are made to the housing 11 which is fixed in place, and the cap 16 can be easily removed for inspection or the like.

The flow of fluid through the pump chamber is controlled by the valves and depends on the direction of rotation of the rotor. The flow through the inlet and outlet ports 14 and 14' is always the same regardless of the direction of the rotor. The manner of operation can best be understood by reference to Fig. 10 wherein the dot-dash lines illustrate the flow when the rotor is rotating in one direction, and the dotted lines illustrate the flow when the rotor is rotating in the opposite direction. If the rotation of the rotor were clockwise as shown by the solid arrow in Fig. 10, the fluid would be drawn in through the duct 14 into the chamber 46 past the valve 36 in the disc 18 into the chamber 34, through the port 32. The slight vacuum in the upper valve chamber 34 causes the inlet valve 36 in that chamber to open and the outlet valve to close. Fluid would then enter that upper chamber from the inlet chamber 46 in the cap 16 through the orifice controlled by the open valve. This fluid would be carried around by the vanes 27 and discharged through the lower port 32 entering the lower valve chamber 34. The increase in pressure in this chamber would press the inlet valve 36 in this lower chamber tight shut, and at the same time would open the outlet valve 49 to allow the fluid to discharge past the valve 49 into the outlet chamber 48 and through the duct 52 into the outlet 14'.

If the direction of rotation of the rotor were reversed, it is apparent that the operation of the valves would automatically be reversed, and that the flow would then be from the inlet 14 to the inlet chamber 46, but in this instance, because of the opposite rotation of the rotor, through the lower inlet valve 36 into the lower valve chamber 34. The flow from chamber 34 would be through lower port 32, pushed around by the rotor blades into the pump chamber 20 through upper duct 32 into the upper valve chamber 34, past its outlet valve 49 into the outlet chamber 48 and through port 52 and outlet duct 14'.

Having thus described my invention, I am aware that numerous and extensive departures may be made therefrom without departing from the spirit or scope thereof.

I claim:

1. A reversible rotary pump comprising a housing having a pump chamber formed therein, a rotor eccentrically mounted for rotational movement in said pump chamber to provide for pressurizing and distributing fluid throughout said pump, said housing having a pair of chambers formed therein substantially opposite to each other and adjacent said pump chamber, and connected to said pump chamber by port members, a cap member closing one end of said housing and having chambers formed therein oppositely to each other and angularly displaced from said chambers in said housing, a valve plate interposed between and separating said housing from said cap member, and having valve members carried therein arranged to selectively connect said chambers in said housing to said chambers in said cap member, second port members in said housing to provide for admittance and escapement of said fluid to and from said rotary pump and interconnected to the chambers in said cap member by third port members formed in said valve plate to provide for passage of said fluid to said chambers in said cap member, said rotor being selectively rotatable in one of several directions to draw fluid into one of said chambers in said cap member in a predetermined direction of flow depending upon the rotation of said rotor, said rotor being operable to cause a pressure differential to exist between said cap chamber and one of said housing chambers whereby one of said valve members is opened interconnecting said chambers to allow fluid to enter into said housing chamber, said rotor then being operable to draw said fluid through one of said port members connecting said housing chamber to said pump chamber and into said pump chamber wherein it is forced into the opposite housing chamber whereby the pressure thereof is of sufficient magnitude to open a second valve member in said valve plate to enable said fluid to flow into the opposite chamber in said cap member and then through one of said third port members into and through one of said second port members and thence to the exterior of said rotary pump.

2. A reversible rotary pump comprising a housing having a pump chamber formed therein, a rotor eccentrically mounted for rotational movement in said pump chamber to provide for pressurizing and distributing fluid throughout said pump, said housing having a pair of horizontal semi-toroidal chambers formed therein substantially opposite to each other and adjacent said pump chamber thereby defining a solid wall member separating said pump chamber from said housing chambers, port means formed in said separting wall connecting each of said housing chambers to said pump chamber, a cap member closing one end of said housing and having chambers formed therein oppositely to each other and angularly displaced from said chambers in said housing, a valve plate interposed between and separating said housing from said cap member, and having valve members carried therein arranged to selectively connect said chambers in said housing to said chambers in said cap member, second port members in said housing to provide for admittance and escapement of said fluid to and from said rotary pump and interconnected to the chambers in said cap member by third port members formed in said valve plate to provide for passage of said fluid to said chambers in said cap member, said rotor being selectively rotatable in one of several directions to draw fluid into one of said chambers in said cap member in a predetermined direction of flow depending upon the rotation of said rotor, said rotor being operable to cause a pressure differential to exist between said cap chamber and one of said housing chambers whereby one of said valve members is opened interconnecting said chambers to allow fluid to enter into said housing chamber, said rotor then being operable to draw said fluid through one of said port members connecting said housing chamber to said pump chamber and ito said pump chamber wherein it is forced into the opposite housing chamber whereby the pressure thereof is of sufficient magnitude to open a second valve member in said valve plate to enable said fluid to flow into the opposite chamber in said cap member, and then through one of said third port members into and through one of said second port members and thence to the exterior of said rotary pump.

3. A reversible rotary pump comprising a housing having a pump chamber formed therein, a rotor eccentrically mounted for rotational movement in said pump chamber to provide for pressurizing and distributing fluid throughout said pump, said housing having a pair of chambers formed therein substantially opposite to each other and adjacent said pump chamber, and connected to said pump chamber by port members, a cap member closing one end of said housing and having an inlet chamber and an outlet chamber formed therein oppositely to each other and angularly displaced approximately ninety degrees from said chambers in said housing, a valve plate interposed between and separating said housing from said cap member, and having valve members carried therein arranged to selectively connect said chambers in said housing to said chambers in said cap member, second port members in said housing to provide for admittance and escapement of said fluid to and from said rotary pump and interconnected to the chambers in said cap member by third port members formed in said valve plate to provide for passage of said fluid to said inlet chamber in said cap member, said rotor being selectively rotatable in one of several directions to draw fluid into said inlet chamber in said cap member in a predetermined direction, of flow depending upon the rotation of said rotor, said rotor being operable to cause a pressure differential to exist between said cap chamber and one of said housing chambers whereby one of said valve members is opened interconnecting said chambers to allow fluid to enter into said housing chamber, said rotor then being operable to draw said fluid through one of said port members connecting said housing chamber to said pump chamber and into said pump chamber wherein it is forced into the opposite housing chamber whereby the pressure thereof is of sufficient magnitude to open a second valve member in said valve plate to enable said fluid to flow into the opposite chamber in said cap member, and then through one of said third port members into and through one of said second port members and thence to the exterior of said rotary pump.

4. A reversible rotary pump comprising a housing having a pump chamber formed therein, a rotor eccentrically mounted for rotational movement in said pump chamber to provide for pressurizing and distributing fluid throughout said pump, said housing having a pair of chambers formed therein substantially opposite to each other and adjacent said pump chamber, and connected to said pump chamber by port members, a cap member closing one end of said housing and having vertical semi-toroidal inlet and outlet chambers formed therein, a valve plate interposed between and separating said housing from said cap member, and having valve members carried therein arranged to selectively connect said chambers in said housing to said chambers in said cap member, second port members in said housing to provide for admittance and escapement of said fluid to and from said rotary pump and interconnected to the chambers in said cap member by third port members formed in said valve plate to provide for passage of said fluid to said chambers in said cap member, said rotor being selectively rotatable in one of several directions to draw fluid into one of said chambers in said cap member in a predetermined direction of flow depending upon the rotation of said rotor, said rotor being operable to cause a pressure differential to exist between said cap member and one of said housing chambers whereby one of said valve members is opened interconnecting said chambers to allow fluid to enter into said housing chamber, said rotor then being operable to draw said fluid through one of said port members connecting said housing chamber to said pump chamber and into said pump chamber wherein it is forced into the opposite housing chamber whereby the pressure thereof is of sufficient magnitude to open a second valve member in said valve plate to enable said fluid to flow into the opposite chamber in said cap member, and then through one of said third port members into and through one of said second port members and thence to the exterior of said rotary pump.

5. A reversible rotary pump comprising a housing having a pump chamber formed therein, a rotor eccentrically mounted for rotational movement in said pump chamber to provide for pressurizing and distributing fluid throughout said pump, said housing having a pair of chambers formed therein substantially opposite to each other and adjacent said pump chamber, and connected to said pump chamber by port members, a cap member closing one end of said housing and having chambers formed therein oppositely to each other and angularly displaced from said chambers in said housing, an impervious valve plate member interposed between and separating said housing from said cap member, and having valve members carried therein arranged to selectively connect said chambers in said housing to said chambers in said cap member, second port members in said housing to provide for admittance and escapement of said fluid to and from said rotary pump and interconnected to the chambers in said cap member by third port members formed in said valve plate to provide for passage of said fluid to said chambers in said cap member, said rotor being selectively rotatable in one of several directions to draw fluid into one of said chambers in said cap member in a predetermined direction of flow depending upon the rotation of said rotor, said rotor being operable to cause a pressure differential to exist between said cap member and one of said housing chambers whereby one of said valve members is opened interconnecting said chambers to allow fluid to enter into said housing chamber, said rotor then being operable to draw said fluid through one of said port members connecting said housing chamber to said pump chamber and into said pump chamber wherein it is forced into the opposite housing chamber whereby the pressure thereof is of sufficient magnitude to open a second valve member in said valve plate to enable said fluid to flow into the opposite chamber in said cap member, and then through one of said third port members into and through one of second port members and thence to the exterior of said rotary pump.

6. A reversible rotary pump comprising a base housing having a rotor chamber formed therein, a rotor rotatably disposed in said chamber and having fluid driving blades, a pair of arcuate chambers in said housing disposed in diametrically opposite sides thereof adjacent the rotor chamber, port members connecting said arcuate chambers to said rotor chamber, inlet and outlet ports formed in said housing between said arcuate shaped chambers, said chambers and ports being open in one end of said housing throughout the entire surface areas thereof, a cap member for said housing adapted to close said end of said housing and formed with a pair of arcuate chambers disposed at diametrically opposite sides thereof, and displaced approximately ninety degrees from the first mentioned arcuate chambers and arranged to register with said chambers near the end portions thereof, the mid-portion of each of said cap chambers being arranged to register with one of said inlet or outlet ports in said housing, valve control means operated by the pressure of the fluid in said rotor chamber comprising a plate formed to be disposed and held between said housing and cap member, said plate being formed with orifices having valves disposed therein, inlet and outlet ports in said plate interconnecting the mid-portion of said cap chambers to said inlet and outlet ports formed in said housing, the rotation of said rotor causing said fluid to flow into said inlet port in said housing and through said inlet port in said plate into one of said cap chambers, said fluid being then of sufficient pressure to operate one of said valve members in said plate to allow said fluid to flow through said orifice into one of said housing chambers, through one of said connecting ports and into said rotor chamber, said rotor then arranged to force said fluid through the opposite connecting port into the housing chamber wherein the pressure of said fluid operates a second valve in said plate to allow said fluid to flow into the opposite cap chamber and through one of said interconnecting ports in said plate, through said outlet port in said housing and thence to the exterior of said rotary pump.

7. A reversible rotary pump comprising a base housing having a rotor chamber formed therein, a rotor rotatably disposed in said chamber and having fluid driving blades, a pair of arcuate chambers in said housing disposed in diametrically opposite sides thereof adjacent the rotor chamber, port members connecting said arcuate chambers to said rotor chamber, inlet and outlet ports formed in said housing between said arcuate shaped chambers, said chambers and ports being open on one end of said housing throughout the entire surface areas thereof, a cap member for said housing adapted to close said end of said housing and formed with a pair of arcuate chambers disposed at diametrically opposite sides thereof, and displaced approximately ninety-degrees from the first mentioned arcuate chambers and arranged to register with said chambers near the end portions thereof, the mid-portion of each of said cap chambers being arranged to register with one of said inlet or outlet ports in said housing, valve control means operated by the pressure of the fluid in said rotor chamber comprising a plate formed to be disposed and held between said housing and cap member, said plate being formed with orifices having valves disposed therein, a valve seat for each of said valves comprising a metallic sleeve having a central body extending through said orifice and a head portion formed on each end thereof, securing said sleeve in said orifice, said valves each having a head and a stem portion extending from said head and through said sleeve, a flexible gasket member attached to one of said head portions of each of said sleeves and arranged to be engageable with the head of each valve to seal said orifices, a spring member attached to each of said valves and in pressure engagement with said valve plate to force said valves against said gasket member sealing said orifices, inlet and outlet ports in said plate interconnecting the mid-portion of said cap chambers to said inlet and outlet ports formed in said housing, the rotation of said rotor causing said fluid to flow into said inlet port in said housing and through said inlet port in said plate into one of said cap chambers, said fluid being then of sufficient pressure to operate one of said valve members in said plate to allow said fluid to flow through said orifice into one of said housing chambers, through one of said connecting ports and into said rotor chamber, said rotor then arranged to force said fluid through the opposite connecting port into the housing chamber wherein the pressure of said fluid operates a second valve in said plate to allow said fluid to flow into the opposite cap chamber and through one of said interconnecting ports in said plate, through said outlet port in said housing and thence to the exterior of said rotary pump.

8. A reversible rotary pump comprising a base housing having a rotor chamber formed therein, a rotor rotatably disposed in said chamber and having fluid driving blades, a pair of arcuate chambers in said housing disposed in diametrically opposite sides thereof adjacent the rotor chamber, port members connecting said arcuate chambers to said rotor chamber, inlet and outlet ports formed in said housing between said arcuate shaped chambers, said chambers and ports being open on one end of said housing throughout the entire surface areas thereof, a cap member for said housing adapted to close said end of said housing and formed with a pair of arcuate chambers disposed at diametrically opposite sides thereof, and displaced approximately ninety-degrees from the first mentioned arcuate chambers and arranged to register with said chambers near the end portions thereof, the mid-portion of each of said cap chambers being arranged to register with one of said inlet or outlet ports in said housing, valve control means operated by the pressure of the fluid in said rotor chamber comprising a plate formed to be disposed and held between said housing and cap member, said plate having a pair of orifices formed therein oppositely to each other on each side of the vertical centerline of said plate, and equally spaced therefrom, valve members disposed in said orifices, said valve members in one pair of said orifices arranged to interconnect one of said cap chambers to said housing chambers, said valve members in said opposite pair of orifices arranged to interconnect the other of said cap chambers to said housing chambers, said first pair of valve members being operatively positioned in said orifices and selectively operable upon a pressure differential existing between the cap and housing chambers in one direction, said second pair of valve members being operatively positioned in said opposite orifices and selectively operable upon a pressure differential existing in the opposite direction between said cap and housing chambers, inlet and outlet ports in said plate interconnecting the mid-portion of said cap chambers to said inlet and outlet ports formed in said housing, the rotation of said rotor causing said fluid to flow into said inlet port in said housing and through said inlet port in said plate into one of said cap chambers, said fluid being then of sufficient pressure to operate one of said valve members in said plate to allow said fluid to flow through said orifice into one of said housing chambers, through one of said connecting ports and into said rotor chamber, said rotor then arranged to force said fluid through the opposite connecting port into the housing chamber wherein the pressure of said fluid operates a second valve in said plate to allow said fluid to flow into the opposite cap chamber and through one of said interconnecting ports in said plate, through said outlet port in said housing and thence to the exterior of said rotary pump.

References Cited in the file of this patent

UNITED STATES PATENTS

| | | |
|---|---|---|
| 1,035,449 | Kinney | Aug. 13, 1912 |
| 1,307,602 | Schirmer | June 24, 1919 |
| 1,470,804 | Buckingham | Oct. 16, 1923 |
| 1,595,381 | Christensen | Aug. 10, 1926 |
| 1,717,814 | Strong et al. | June 18, 1929 |
| 2,073,774 | Atteslander | Mar. 16, 1937 |
| 2,107,152 | Huber | Feb. 1, 1938 |
| 2,148,561 | Kempton et al. | Feb. 28, 1939 |
| 2,151,482 | Neeson | Mar. 21, 1939 |
| 2,277,270 | Schmitter et al. | Mar. 24, 1942 |

FOREIGN PATENTS

| | | |
|---|---|---|
| 253,397 | Germany | Nov. 1912 |
| 487,563 | Germany | Dec. 10, 1929 |
| 596,170 | Great Britain | Dec. 30, 1947 |
| 626,974 | Great Britain | July 25, 1949 |